INVENTORS
CHARLES E. SEARIGHT
HUGH W. SMALLEY
HYMAN L. ROBINSON

June 23, 1964 C. E. SEARIGHT ETAL 3,138,444
METHOD AND APPARATUS FOR MANUFACTURING GLASS BEADS
Filed Jan. 27, 1961 4 Sheets-Sheet 2

INVENTORS
CHARLES E. SEARIGHT
HUGH W. SMALLEY
HYMAN L. ROBINSON

BY Malcolm W. Fraser
ATTORNEY

June 23, 1964   C. E. SEARIGHT ETAL   3,138,444
METHOD AND APPARATUS FOR MANUFACTURING GLASS BEADS
Filed Jan. 27, 1961   4 Sheets-Sheet 3

INVENTORS
CHARLES E. SEARIGHT
HUGH W. SMALLEY
HYMAN L. ROBINSON

BY Malcolm W. Fraser
ATTORNEY

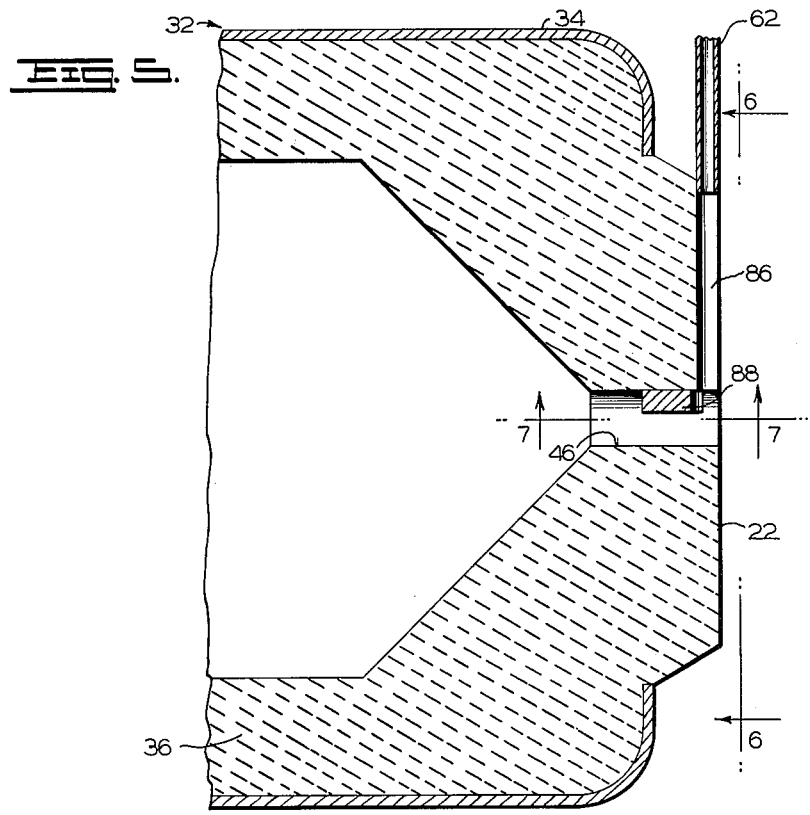
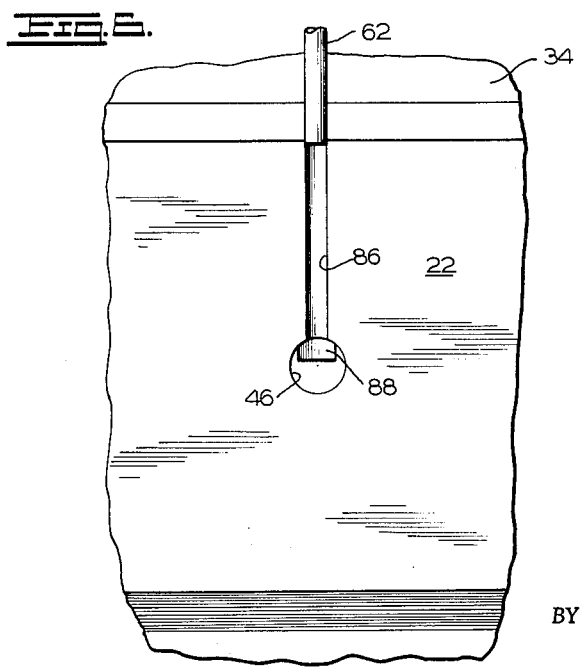
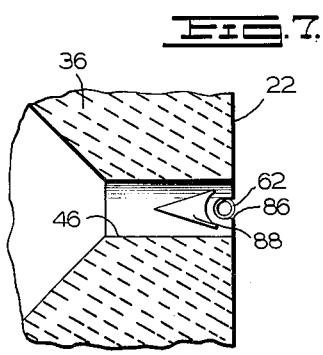
INVENTORS
CHARLES E. SEARIGHT
HUGH W. SMALLEY
HYMAN L. ROBINSON ns patent Office 3,138,444
Patented June 23, 1964

3,138,444
METHOD AND APPARATUS FOR MANUFACTURING GLASS BEADS
Charles E. Searight, Hugh W. Smalley, and Hyman L. Robinson, Jackson, Miss., assignors to Cataphote Corporation, Toledo, Ohio, a corporation of Ohio
Filed Jan. 27, 1961, Ser. No. 85,421
6 Claims. (Cl. 65—21)

The present invention relates to the production of glass beads and more particularly to a method and apparatus for manufacturing minute glass beads for various reflective and industrial purposes.

The conventional methods and apparatus employed in the production of glass beads are less economical than the present invention. In the method and apparatus of this invention the glass beads are formed directly from the molten glass; whereas in the conventional methods and apparatus the glass beads are formed from previously manufactured glass which has been cooled, crushed and screened to the approximate size of the glass beads desired and then fed into a furnace having an upwardly directed flame which spherulizes the glass particles and carries them upwardly. The spherulized glass beads pass through a relatively cooler zone wherein the glass is caused to solidify and then are subsequently collected in suitable troughs adjacent the top or exhaust end of the tower of the furnace. An example of such apparatus is shown and described in the United States Patent to C. E. Searight, 2,730,841.

Among the disadvantages of such conventional processes is that they are uneconomical when applied to volume production, in that the glass which has been reduced to a molten state in its original manufacture is cooled to a solid state and after being pulverized is then reheated to a molten state in order to spherulize the pulverized material. The consequent loss of efficiency through two separate and distinct heating steps is obvious.

Another disadvantage of the conventional processes is that glass, being a highly abrasive material, is exceedingly detrimental to the customary rock crushing and similar equipment used for its size reductions, consequently, both the equipment and the maintenance thereof is expensive and time-consuming.

A further disadvantage resides in the fact that a large quantity of glass which was originally smelted is lost during pulverization as dust too fine to be used in the process. Such losses have been found to be from 5 to 15% of the original glass.

This invention is an improvement over the invention described and claimed in copending application Serial No. 768,250, filed October 20, 1958, entitled "Method and Apparatus for Manufacturing Glass Beads," C. E. Searight.

It is an object of the present invention to provide a method and apparatus for forming glass beads wherein the glass beads are formed directly from a molten stream of glass.

Another object of the invention is to provide a method and apparatus for fabricating small glass beads which is efficient and economical.

These and other objects and advantages are produced by the improved method and apparatus of the invention wherein the molten glass stream is conducted directly to the combustion zone of the furnace where the greatest amount of turbulence occurs. At this point the molten glass stream is atomized into small particles of molten glass which due to the surface tension thereof promptly form spherical beads.

The invention will be more clearly understood from the following detailed description in connection with the attached drawings in which, FIG. 1 is a side elevation partly in section of one embodiment of the invention;

FIG. 5 is a sectional view of the modified form of the outlet nozzle of the primary burner and molten glass feed line illustrated in FIGS. 1, 2 and 4;

FIG. 6 is a fragmentary sectional view of the burner and molten glass feed line taken along line 6—6 of FIG. 5; and FIG. 7 is a sectional view taken along line 7—7 of FIG. 5.

Figure 1:
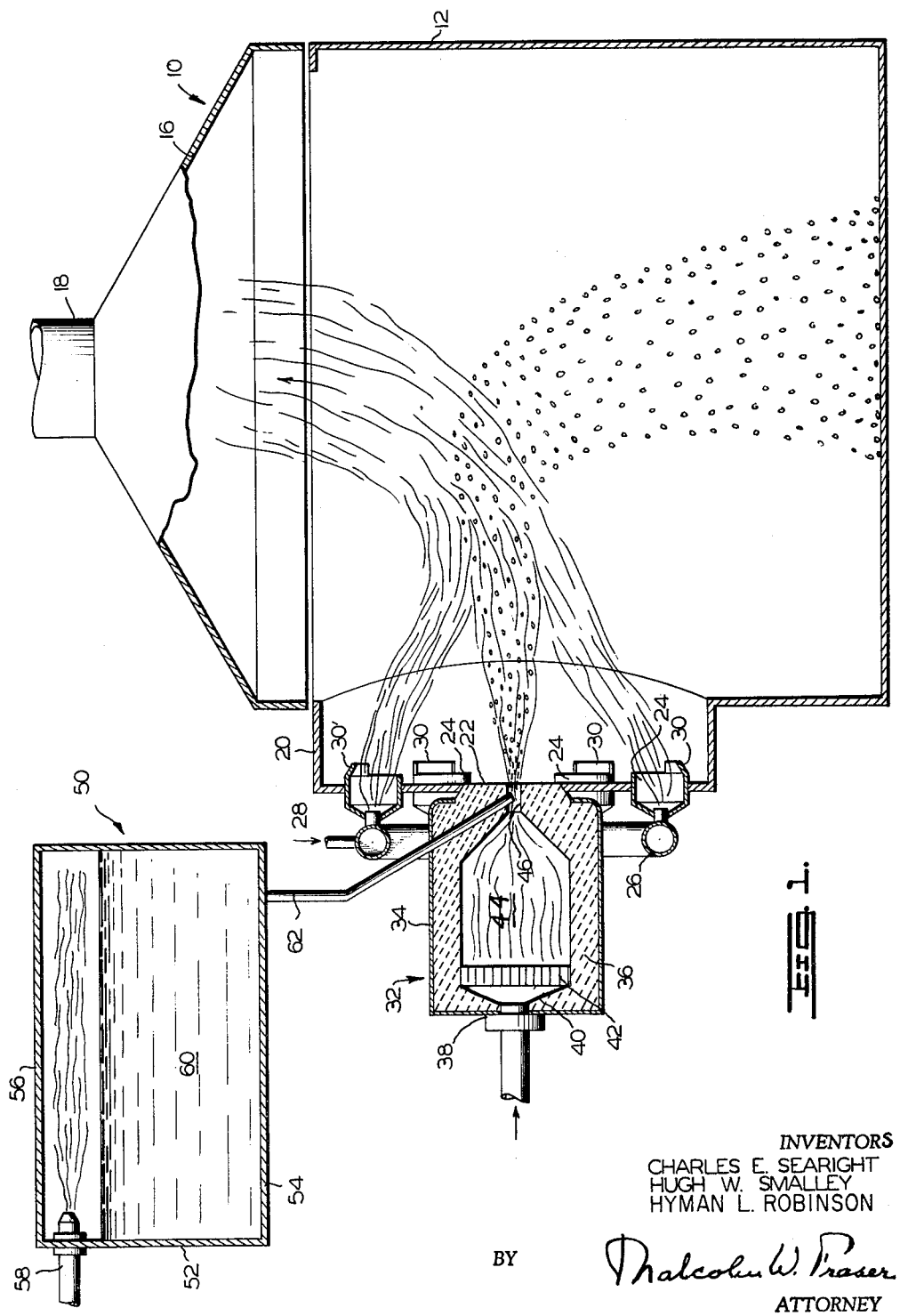
Figure 2:
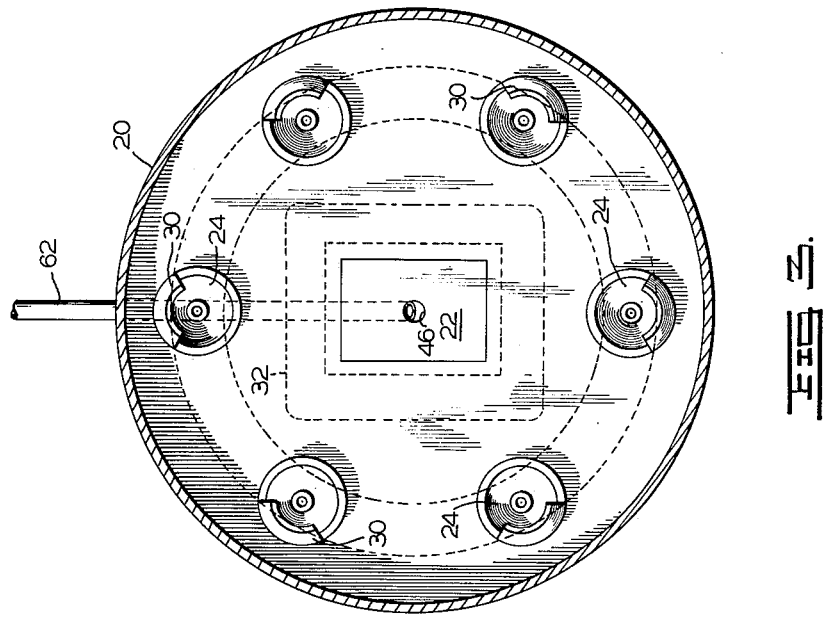
FIG. 2 is an enlarged fragmentary view of the combustion zone of the primary and secondary burners of the furnace illustrated in FIG. 1 showing the action of the turbulent combusting gas stream on the molten glass stream.
Figure 3:
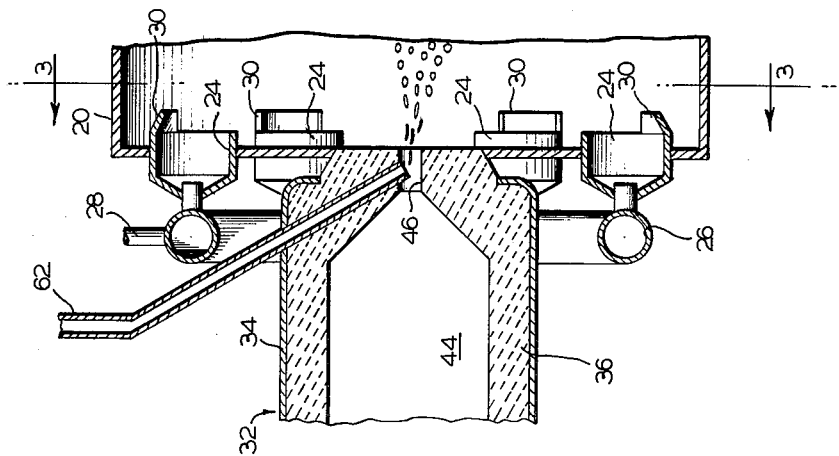
FIG. 3 is a sectional view of a portion of the furnace taken along line 3—3 of FIG. 2.

Referring to FIGS. 1 to 3, there is illustrated an embodiment of the invention which is referred to as a horizontal type furnace. More particularly this terminology relates to the general direction of the flow of hot gases into the furnace. The apparatus consists of a furnace generally indicated by the reference numeral 10 having a vertically extending side wall 12 which may be any desired shape such as round, rectangular, etc. The furnace 10 also includes a bottom wall 14 and a top portion 16 suitably contoured to allow for the concentration and exhaust of combusted gases as through a centrally located exhaust stack 18.

The side wall 12 of the furnace 10 is provided with an outwardly extending portion 20 suitable for housing a primary hot gas inlet nozzle 22 and a set of secondary hot gas inlet nozzles 24. In the illustrated embodiment there are six secondary gas inlet nozzles; however, it must be understood that this number may be varied within the spirit of the invention.

The secondary hot gas inlet nozzles 24 are connected to a source of hot gases through an annular manifold 26 and an inlet pipe 28. It will be noted that the secondary hot gas nozzles 24 are each provided with a deflector 30 which functions to cause the respective emergent gas stream to be inwardly and toward a focal point in the interior region of the furnace as will be explained in greater detail hereinafter.

The primary hot gas inlet nozzle 22 comprises the outlet end of a primary burner 32 which is basically a miniature refractory-lined furnace, in which heat is released at high rates and at temperatures of the order of 3000° F. and at velocities as high as 2500 ft./sec.

The burner 32 comprises an outer wall 34 which is lined with any suitable refractory material 36 and has a fuel and air inlet 38. The combustible mixture fed to the inlet 38 enters a plenum chamber 40, through a perforated ceramic plate 42, and into the main combustion chamber 44. The interior walls of the combustion chamber 44 taper at the outlet end to form a blast passage 46 formed in the nozzle 22. The interior walls of the refractory lining 36 attain white-hot incandescence and intense radiation plays from wall-to-wall across the travel of the combustion gases, thereby accelerating the combustion reaction.

The superheated blast issues from the outlet nozzle 22 through the passage 46 and is directed toward the interior of the furnace 10.

A tank or molten glass conditioner 50 is disposed remote from the furnace 10 and comprises a chamber defined by side walls 52, a bottom wall 54, and a top wall 56. A conventional burner 58 is disposed in one of the side walls 52 and is effective to maintain a sufficient temperature within the tank to maintain a reservoir of molten glass 60.

The tank 50 communicates with the burner 32 by means of a pipe 62 which permits molten glass to flow from the tank 50 to the nozzle-end of the burner 32.

It will be noted, with particular reference to FIG. 2, that the outlet end of the pipe 62 is disposed approximately midway of the blast passage 46. And further, it is important to note that the outlet end of the pipe 62 extends radially into the passage 56 so that the molten glass stream emerging from the pipe 62 is emitted at substantially the mid-point of passage 46. The outlet end of the pipe 62 must be disposed at a point in the passage 46 such that the glass particles formed by the interaction of the turbulent gas flow through the passage and the glass stream do not "fan out" and clog the passage. Also, the outlet end of the pipe 62 must be disposed at a point where the glass does not freeze at the outlet end thereof.

It has been found that if the outlet end of the pipe 62 is too far from the outlet end of the blast passage 46, the glass will attenuate, regardless of its composition, and form fibers rather than the desired small rods which form into spheres. On the other hand, if the outlet end of the pipe 62 is too close to the outlet end of the blast passage 46, two problems are encountered. First, the rapid expansion of the gases emitted from the passage 46 acts to cool the glass at the outlet end of the pipe 62 and thereby impedes the flow of glass therethrough. Second, the vacuum created by the rapidly expanding gases emitted from the passage 46 tends to pull gobs of glass from the pipe 62, interrupting the steady flow of the glass therefrom and produces large slugs of glass rather than the required finely divided particles.

Further, it has been found that the pipes 62 may be formed of any suitable refractory material except that the tip of the pipe should be of a material which will not be wetted by the transient molten glass stream, such as platinum or an alloy thereof. It will be appreciated that if the molten glass were able to wet the outlet end of the pipe 62, the glass would tend to stick thereto and impede the steady flow of the glass stream into the passage 46.

It has been found that for an inside diameter of 1 inch and a length of 2 inches for the blast passage 46, satisfactory results are achieved by placing the outlet end of the pipe 62 at approximately ¼ inch from the outlet of the blast passage 46. The inside diameter of the pipe 62 was ¼ inch. Accordingly, the ratio of the length of the passage 46 to diameter is preferably not less than approximately 2:1.

In operation, the temperature of the glass 60 in the container 50 is maintained generally at approximately 250° F. to 500° F. above the normal working temperature range of the particular glass composition being used to thereby maintain the glass in the container 50 in a highly molten condition. The molten glass is then caused to flow from the container 50 through pipe 60 to the passage 46. The high velocity gas stream in the blast passage 46 of the burner 32 functions to divide the molten glass stream into a plurality of thin molten streams. The gas emitting from the passage 46 into the furnace tends to expand rapidly as it enters the furnace 10 and form a zone of high turbulence. The turbulence of the hot gases effectively breaks the thin molten streams of glass into a plurality of small rod-shaped particles. These small rods quickly become spherulized to form small glass beads, by the surface tension of the glass. The glass is held at an elevated temperature by the combined action of the heat energy produced by the primary burner 32 and the plurality of secondary burners 24. The temperature within the primary burner 32 is typically maintained within a range of from 2500° to 2900° F. while the gas emitted from the after-burners 24 is maintained in the order of 1800° F. Among the principal functions of the primary burner 32 is to atomize the glass and to direct the flow or travel of the atomized glass toward the interior of the furnace 10; while the secondary burners 14 function to maintain the atomized glass at a sufficiently elevated temperature to allow the same to become completely spherulized as well as to provide additional turbulence within the gases in the furnace to assure that all the fibers of glass are broken up into small rods which then form into small glass beads.

As soon as the spherulized glass beads lose their forward velocity caused by the combined action of the burners 32 and 24, they drop toward the bottom of the furnace 10 and in falling pass through zones of relatively lower temperature. The glass beads thereupon solidify and are collected at the bottom wall 14 of the furnace 10. The exhaust gases from the furnace 10 are removed therefrom through the outlet stack 18.

Figure 4:
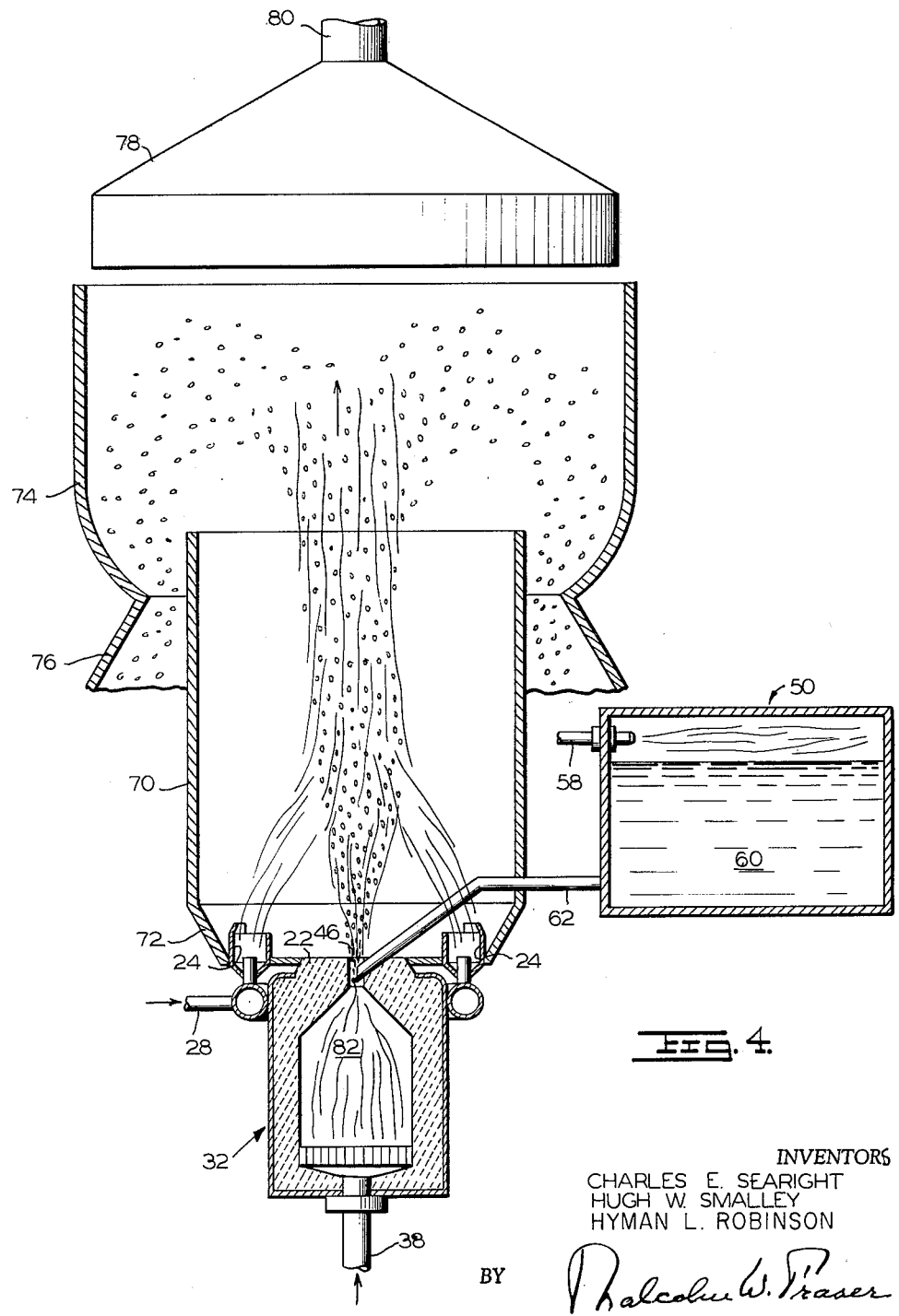
FIG. 4 is a side elevation, partly in section, of a modification of the apparatus illustrated in FIG. 1 wherein the combustion gases and formed glass beads are caused to travel in a generally vertical direction.

FIG. 4 shows a modification of the apparatus illustrated in FIGS. 1, 2 and 3. The apparatus illustrated in FIGS. 1, 2 and 3 may be referred to as a horizontal type apparatus since the gas streams tend to cause the atomized glass particles in a generally horizontal direction. The apparatus illustrated in FIG. 4 may be referred to as a vertical type apparatus since the gas streams tend to cause the atomized glass particles in a generally vertical direction. Since a substantial portion of the individual structural elements of the apparatus of FIG. 4 are identical with corresponding elements of FIGS. 1, 2 and 3 a further description thereof is deemed unnecessary. However, the modified elements will be described in detail.

Specifically referring to FIG. 4, there is provided a furnace having an upstanding side wall 70, a downwardly depending and inwardly extending bottom wall 72, and an open top. An annular upper wall 74 having an outwardly flaring bottom skirt 76 surrounds and is spaced from the open top portion of the side wall 70. An exhaust hood 78 having an exhaust stack 80 for exhaust gases is disposed at upper end of the upper wall 74.

It has been found advantageous in the vertical type apparatus of FIG. 4 to form a slight lip 82 on the exit end of the glass conducting pipe 62. The lip 82 militates against any undesired downward flow of molten glass emerging from the pipe 62 into the passage 46.

In operation, the molten glass 60 from the tank 50 flows into the passage 46 through the pipe 62, whereupon the glass stream is formed into a plurality of thin molten streams by the high velocity of the gases flowing from the primary burner 32 through the blast passage 46. The high velocity gases passing through the passage 46 tend to expand rapidly as they enter the furnace 10 thereby causing a zone of turbulence within the furnace. The turbulence of the gases acts to break the thin molten streams of glass into a plurality of small glass rods. The energy of the gas traveling upwardly through the passage 46 carries the glass rods upwardly into the furnace chamber defined by the side wall 70. The plurality of small rod shaped particles of glass are caused to become spherulized by the surface tension of the glass. The combined action of the primary burner 32 and the secondary burners 24 carry the glass particles upwardly, until they become solidified in the relatively lower temperature zone in the region defined by the annular upper wall 74. The glass has at this stage become spherulized and has formed into beads which tend to fan-out towards the side walls 74, whereupon the beads lose their upward momentum and fall downwardly by gravity through the annular space between the skirt 76 and the outer surface of the upstanding side wall 70 and are finally collected in any suitable collection means such as an annular hopper, not shown.

Another modification of the apparatus illustrated in FIGS. 1, 2 and 3 and hereinbefore described is illustrated in FIGS. 5, 6 and 7 and relates to a modified form of the invention for delivering the molten glass from the reservoir to the center axis of the primary gas passage adjacent the outlet end thereof.

Referring specifically to FIGS. 5, 6 and 7, the nozzle end 22 of the primary burner 32 is provided with a vertically extending slot 86, the upper extremity of which is in communication with the molten glass conducting pipe 62 and the lower extremity is in communication with outlet end of the blast passage 46.

Secured within and slightly rearwardly of the outlet end of the passage 46 and in alignment with the slot 86, there is a streamlined deflecting element 88. The deflecting element 88 flares outwardly in a downstream direction with respect to gas flow and its downstream end is contoured to conform generally to the cross sectional configuration of the slot 86.

The above described modification provides a relatively simple expedient for allowing the molten glass to enter the midpoint of the gas stream before being contacted by the violent action of the transient gases.

It will be appreciated by those skilled in the art that the size of the resultant glass beads produced by the described method and apparatus is dependent on a number of variable factors. These factors include the viscosity of the glass batch, the diameter of the exit orifice from the glass tank, and the velocity and temperature of the heated gases emerging from the high-pressure jet.

Although glass of various different types may satisfactorily be used in carrying out the objectives of this invention, it has been found that excellent results were obtained with a modified soda-lime-silicate type glass of the following constituents: silicon dioxide, $SiO_2$, 68%; soda ash, $Na_2CO_3$, 10%; barium carbonate, $BaCO_3$, 4%; lime, CaO, 16%; fluorides, 2%.

While we have described a preferred method and apparatus for forming glass beads from a molten glass stream, it will be understood that various modifications and changes may be made within the method and apparatus herein described without departing from the spirit of our invention or the scope of the appended claims.

We claim:

1. Apparatus for producing small glass beads including a furnace, a constricted primary hot gas inlet passage communicating with said furnace and effective to create a zone of high turbulence of the hot gases passing therethrough, said constricted inlet passage having substantially constant dimensions throughout the length thereof, a molten glass supply means, and conduit means communicating at one end with said molten glass supply means for conducting a molten stream therefrom and opening at the other end into the zone of high turbulence created by said constricted hot gas inlet passage.

2. Apparatus for producing small glass beads including a furnace, a constricted primary hot gas inlet passage communicating with said furnace and effective to create a zone of high turbulence of the hot gases passing therethrough, said constricted inlet passage having substantially constant dimensions throughout the length thereof, a molten glass supply means, conduit means communicating at one end with said molten glass supply for conducting a molten stream therefrom and opening at the other end into the zone of high turbulence created by said constricted hot gas inlet passage, and a set of secondary hot gas inlet means disposed adjacent said primary hot gas inlet passage.

3. Apparatus for producing small glass beads including a furnace, a constricted primary hot gas inlet passage communicating with said furnace and effective to create a zone of high turbulence of the hot gases passing therethrough, said constricted inlet passage having substantially constant dimensions throughout the length thereof, a molten glass supply means, conduit means communicating at one end with said molten glass supply means for conducting a molten stream therefrom and opening at the other end into the zone of high turbulence created by said constricted hot gas inlet passage, and a set of secondary hot gas inlet means disposed adjacent said primary hot gas inlet passage wherein said second of secondary hot gas inlet means is disposed annularly about and spaced from said primary hot gas inlet passage.

4. Apparatus for producing small glass beads including a furnace, a constricted primary hot gas inlet passage communicating with said furnace and effective to create a zone of high velocity within said passage and a zone of high turbulence of hot gases passing therethrough, said constricted inlet passage having substantially constant dimensions throughout the length thereof, a molten glass supply means, and conduit means communicating at one end with said molten glass supply means for conducting a molten stream therefrom and opening at the other end into the zone of high turbulence created by said constricted hot gas inlet passage wherein said primary hot gas passage includes a gas deflecting means in the zone of high velocity allowing the molten glass stream to enter the zone substantially at the center thereof.

5. Apparatus for producing small glass beads as claimed in claim 1 wherein the length of said hot gas inlet passage is approximately twice the diameter thereof.

6. A method for producing small glass beads which comprises providing a stream of hot gases of a temperature above the normal working temperature range of the glass and having a zone of high velocity, introducing a stream of molten glass into said zone to thereby cause said glass stream to form into a plurality of fine molten glass streams, introducing said streams into a zone of high turbulence, thereby effectively breaking said streams into a plurality of small glass rods, maintaining the temperature of said rods sufficiently high to allow the surface tension of the glass to form said glass rods into glass beads, cooling said glass beads, and thereafter collecting said glass beads.

References Cited in the file of this patent

UNITED STATES PATENTS

| | | |
|---|---|---|
| 2,619,776 | Potters | Dec. 2, 1952 |
| 2,626,484 | Stalego | Jan. 27, 1953 |
| 2,717,416 | Fletcher | Sept. 13, 1955 |
| 2,965,921 | Bland | Dec. 27, 1960 |
| 2,972,169 | Stalego | Feb. 21, 1961 |
| 3,015,127 | Stalego | Jan. 2, 1962 |